United States Patent Office 2,800,842
Patented July 30, 1957

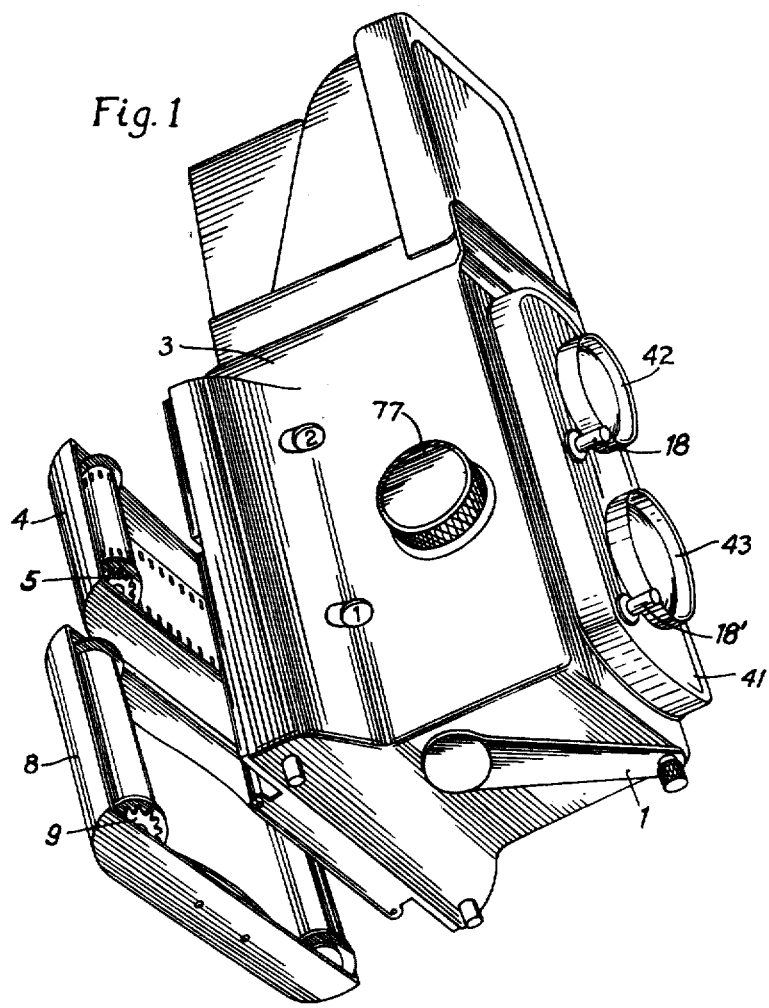

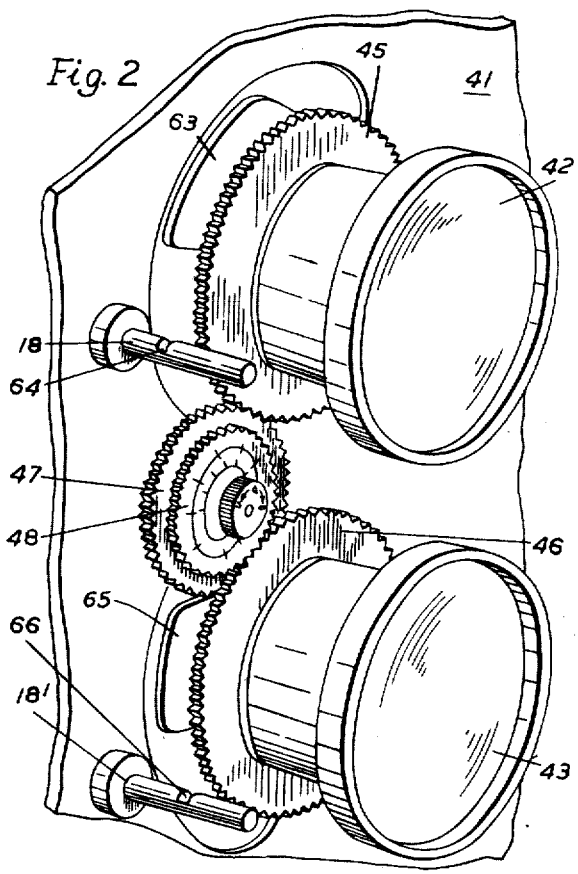
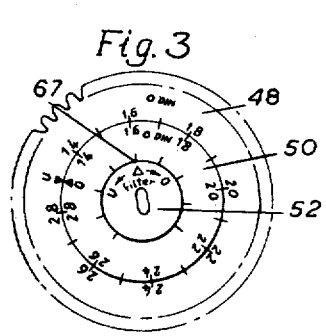
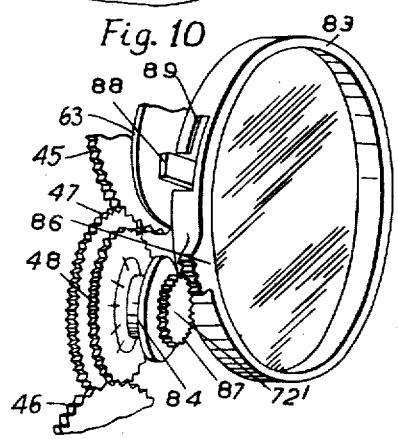

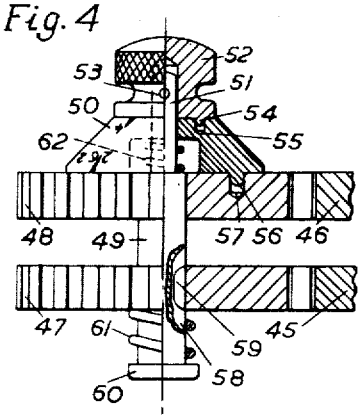
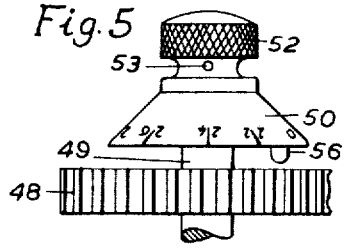
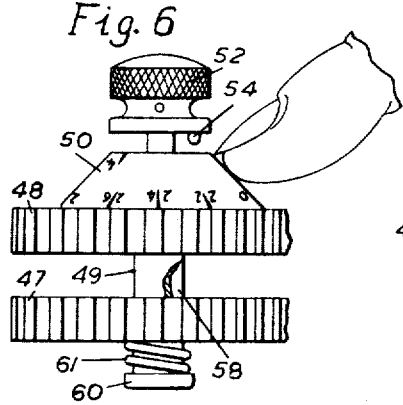
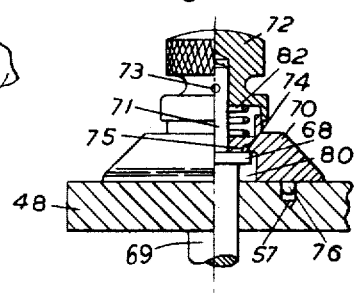
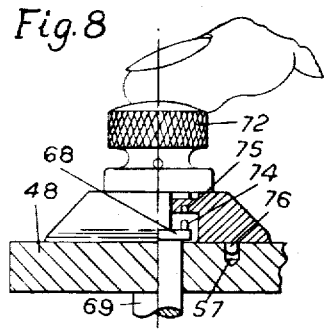
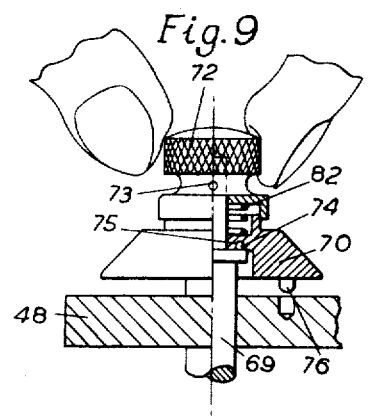

2,800,842
PHOTOGRAPHIC CAMERA

Hermann Friedrich Albrecht, Braunschweig, Germany, assignor to Franke & Heidecke, Fabrik Photographischer Präzisions-Apparate, Braunschweig, Germany, a German firm Application May 18, 1955, Serial No. 509,321
In Germany May 6, 1949

Public Law 619, August 23, 1954
Patent expires August 23, 1974

18 Claims. (Cl. 95—11)

This invention deals with twin cameras or multiple film cameras mounted in a single housing or casing. The invention is applicable to various kinds and styles of such cameras, but is particularly designed and intended for use with the camera disclosed in the co-pending joint patent application of Reinhold Heidecke and the present applicant, Serial No. 508,748, filed May 16, 1955. Certain details of such a camera (with which the present invention is preferably but not necessarily used) are disclosed also in Figs. 1–7 of the drawings and the corresponding parts of the description of the British patent specification No. 713,068, published August 4, 1954, which British patent specification, however, is not prior art against the present United States application, because of the priority rights to which the present United States application is entitled.

In a muliple film camera of the particular kind or construction above identified, and in various other kinds of multiple film cameras having separate lenses and shutters for making separate exposures on the two films, there is the problem of making quick adjustment of the diaphragms or stops of both of the lenses or shutters (or adjustments of the shutter speeds, if that is preferred instead of adjusting the diaphragms) in a quick and satisfactory manner so that both of the joined cameras will be equally ready for the quick making of an exposure, at least so far as proper setting of diaphragm aperture or shutter speed is concerned. This problem may be further complicated by the fact that the films used in the two cameras may have different sensitivities or speeds, so that the two shutters should be adjusted to different diaphragm apertures, and likewise may be complicated by the fact that perhaps a filter is being used with the lens in one camera but not with the lens of the other camera, so that a filter factor is to be taken into account when adjusting the diaphragm or the shutter speed of one shutter, but not the other.

It is to this problem of the quick, easy, and satisfactory adjustment of diaphragm apertures or shutter speeds of the two joined cameras, that the present invention is addressed. An object of the invention is the provision of generally improved and more satisfactory adjusting means for simultaneously and properly adjusting the diaphragm aperture (or the shutter speed) of what may be called a multiple film camera, or two separate cameras joined to each other as by a common housing or casing.

Another object is to provide a diaphragm adjusting means which is adapted to correlate the diaphragm mechanisms of a pair of integrally mounted cameras with regard to the sensitivity of the film employed with the respective cameras, and thereafter adjust both such diaphragm mechanisms simultaneously by movement of a single actuating member.

Still another object is the provision of adjusting means capable of orienting the diaphragm aperture adjusting members of a pair of independent cameras relative to each other in accordance with the filter factor of a light filter employed with either of such cameras, to enable both such diaphragm apertures to be concomitantly adjusted theerafter by a single actuating member.

A further object is to provide, for a pair of cameras mounted within a common housing, means for correlating and simultaneously adjusting the diaphragm mechanism of such cameras, and which is adapted to prevent shutter operation of either of such cameras when its diaphragm mechanism is adjusted beyond allowable limits.

A still further object is to provide, for a twin camera construction, diaphragm adjusting means for both cameras which is simple in construction and operation, and which may be employed with existing camera structures without materially modifying their original function or mode of operation.

These and other desirable objects may be attained in the manner disclosed as an illustrative embodiment of the invention in the following description and in the accompanying drawings forming a part hereof, in which:

Fig. 1 is a perspective view illustrating the twin camera housing construction for the individual cameras with which the present invention is adapted for use;

Fig. 2 is a fragmentary and somewhat diagrammatic perspective view of the front portion of the camera housing, showing one form of the present invention applied thereto;

Fig. 3 is a front elevation of the diaphragm setting knob shown in Fig. 2;

Fig. 4 is a partial section through a portion of the diaphragm adjusting means shown in Fig. 2, illustrating the relative locations of the parts as they appear in normal operative position;

Fig. 5 is a view similar to Fig. 4, showing the position of the diaphragm setting knob during the making of an adjustment for correlation of the individual camera diaphragms in accordance with the difference in speed of the film employed in the respective cameras.

Fig. 6 is a view similar to Fig. 5, showing the position of the diaphragm setting knob during compensating adjustment of the stop apertures for the filter factor of the light filter employed with either of the twin cameras;

Fig. 7 is a view similar to Fig. 4, showing a modified diaphragm setting knob in normal operation position;

Fig. 8 is a view similar to Fig. 6 illustrating the manner of effecting filter factor adjustment with the modified construction;

Fig. 9 is a view similar to Fig. 5, illustrating the relative positions of the diaphragm adjusting elements of the modified construction during adjustment of the camera diaphragms for difference in film sensitivity; and Fig. 10 is a perspective view illustrating a modification of the structure shown in Figs. 7–9, which facilitates automatic filter factor adjustment as the filter unit is applied to one of the twin cameras.

The same reference numerals throughout the several views indicate the same parts.

Referring now to the drawings, there is shown in Fig. 1 the preferred form of camera with which the present invention is designed to be used, although it is possible to use the invention with other forms of twin cameras or duplex cameras, as already mentioned. The preferred form of camera as shown in Fig. 1 constitutes, in effect, what may be considered as a variation upon the well-known twin lens reflex cameras manufactured by the firm of Franke & Heidecke, in Braunschweig, Germany, under the trademarks "Rolleiflex" and "Rolleicord," and widely used in the United States and elsewhere. In the conventional twin lens reflex cameras of this type, there are two chambers in a single housing or casing, both chambers having lenses, the upper chamber being the finder chamber and having a focusing or finder screen and a mirror to reflect the image onto the screen. The lower chamber serves as the picture taking chamber or true camera chamber. Only the lower chamber is provided with a shutter and with a supply of photographic film, in this conventional construction mentioned.

In the variation above mentioned, however, the upper chamber or finder chamber is so constructed that it also may be used as a picture-taking camera, being provided with its own shutter and its own supply of film, and provision being made for shifting the reflex mirror of the way, when a picture is to be taken with the upper camera. Thus two dissimilar supplies of film may be used, differing from each other in any desired way (e. g., in size, or in speed or sensitivity, or one may be black and white film while the other is color film, etc.) and the operator, after finding the correct field of view and focusing the camera by the use of the upper or finder chamber (or by any other finder that may be provided) has the choice of taking the picture with either the upper camera or the lower camera, depending upon which type or size of film is most suitable for use at the moment. The general features of such a twin camera or multiple film camera are disclosed in Swiss Patent No. 234,599, granted October 15, 1944, to said firm of Franke & Heidecke. Certain specific features of such a camera, relating particularly to the manner of feeding the film and operating the shutters of the two cameras, are disclosed in said co-pending application above mentioned, and in said Fig. 1–7 of said British Patent 713,068.

The camera body itself is indicated in general at 3, and is provided with two separable or removable back sections 4 and 8 for the upper and lower cameras or chambers, respectively, each carrying its own independent supply of photographic film fed or transported by turning the respective take-up rolls by operating the respective take-up gears 5 and 9 upon operation of the film winding or feeding handle 1, through intermediate gearing or mechanism as disclosed in said co-pending application and said British patent.

The camera body 3 is also provided with a front section indicated in general at 41, preferably mounted for slight forward and backward movement for focusing purposes in known manner, in response to turning a suitable focusing control member such as the knob 77. This movable or shiftable front carries the respective lens and shutter assemblies 42 and 43 for the upper and lower cameras, respectively. The upper camera shutter is released or tripped for taking an exposure, by pressing inwardly on the trigger or release button or plunger 18, while the lower camera shutter is likewise operated to take an exposure by pressing inwardly on the lower trigger or release button or plunger 18'.

For most effective and satisfactory operation, it should be possible to adjust the diaphragm apertures or stops of both shutters simultaneously, so that when any necessary adjustment is made (for lighter or darker illuminating conditions, for example) the adjustment once made will apply to both of the cameras. It is inconvenient, awkward, and time consuming to require separate adjustments of the diaphragm apertures of the two cameras, especially when the equipment is being used by an amateur photographer, and the extra time required in making two adjustments instead of one may easily result in loss of the opportunity to take a desired picture. Also, to save the extra effort and time of separate calculation of exposure duration or speed for the two cameras, it should preferably be possible to set the two diaphragm apertures differentially, taking into account the different film speeds applying to the two cameras, so that thereafter the diaphragm apertures may be adjusted simultaneously and the exposure duration or speed, when once determined for either camera, will apply equally to both cameras. Alternatively, it can be shutter speed which is differentially adjusted while aperture is kept the same in both cameras, although the other arrangement first mentioned is preferred.

Referring now to Figs. 2–6, and particularly to Fig. 2, an arrangement accomplishing the desired results is shown. On each of the lens and shutter assemblies 42 and 43 for the respective upper and lower cameras, there is mounted a rotary adjusting member 45 and 46, respectively, mounted for rotation about the optical axis of the lens and shutter assembly. This member may be used for adjusting either the diaphragm aperture, or the shutter speed, preferably the former. In practically all modern shutters of the objective or between-the-lens type, the aperture of the iris diaphragm is adjusted by turning one adjusting member, externally accessible on the shutter casing, in one direction or the other circumferentially of the casing, and the shutter speed is also adjusted by turning a different adjusting member circumferentially on the shutter casing, both movements being substantially about the optical axis of the shutter and lens, as a center of rotation. It is deemed unnecessary to show the exact details of connection between the rotary members 45 and 46, and the conventional rotary diaphragm adjusting member or rotary shutter speed adjusting member as commonly found in modern shutters, because any suitable form of connection may be used. For example, the usual radial arm which forms a conventional part of the diaphragm adjusting ring of most modern shutters, may be secured directly to the present rotary member 45 (or 46, as the case may be) by means of a screw or rivet, or it may be embraced between two circumferentially spaced pins on the member 45 (or 46) and constantly urged by a spring toward one of such pins, if some lost motion is desired between the member 45 (or 46) and the diaphragm adjusting member.

According to the present invention, these members 45 and 46 lie in different planes, spaced from each other axially of the shutter and lens assembly, the plane of the member 46 being somewhat forwardly from that of the member 45, in the specific form shown. These adjusting members 45 and 46 are formed with gear teeth on their peripheries, and they mesh respectively with driving gears 47 and 48 both mounted on a common shaft 49. The adjusting gears or rings 45 and 46 of the two cameras are preferably of the same diameter, and the meshing gears 47 and 48 are likewise preferably of the same diameter, so that equal turning movements of the latter gears will cause equal adjustment of the two shutters of the two cameras. But in Figs. 2 and 10, the forward gear 48 is shown somewhat smaller than the rear gear 47, simply for the sake of clarity so that it will not interfere with illustration of the gear 47. Any suitable bearing or support (not shown) is provided for the shaft 49.

The gear 48 is both rotatable and axially movable relative to the shaft or axle 49. The other gear 47 is axially movable relative to the shaft, but is non-rotatably secured thereto, as by means of a spline 59 on the gear being longitudinally slidable in a keyway 58 on the shaft. Actual axial movement occurs in the shaft, however, rather than in the gears, any suitable means (not shown) being formed on the camera structure to hold both of the driving gears 47 and 48 against axial movement, keeping them meshed with and in the same planes with their respective adjusting gears 45 and 46, notwithstanding axial movements imparted to the shaft 49. The shaft has an enlarged rear end 60, and a coiled spring 61 presses rearwardly on this enlarged rear end and forwardly on the gear 47, thus constantly tending to pull the shaft 49 rearwardly relative to both gears 47 and 48.

The forward end of the shaft, projecting forwardly beyond the gear 48, is of somewhat reduced diameter as shown at 51, and carries an intermediate driving member in the form of an operating knob 52 fixed to the shaft as by a pin 53. Behind the knob is a scale disk 50 arranged both rotatably and longitudinally movable on the shaft. The rear face of the operating knob 52 carries a projection 54 which may be engaged in any one of a series of circumferentially arranged depressions or indentations 55 formed in the front face of the scale disk 50, at angular intervals corresponding to the filter factor degree markings mentioned below. The scale disk 50, in turn, carries on its rear face a similar projection 56 which may be seated in any one of a circumferentially arranged series of recesses or indentations 57 formed in the front face of the gear 48, at intervals corresponding preferably to the below-mentioned film sensitivity degree markings. A portion of the rear face of the scale disk 50 is recessed around the shaft, and contains a light coiled spring 62 which presses rearwardly on the front face of the gear 48 and forwardly on the scale disk 50, but this spring is of less power or force than the spring 51 which tends to pull rearwardly on the shaft 49.

The scale disk is preferably of frusto-conical form as illustrated, and the larger or rear end thereof is provided with suitable scale markings in accordance with any recognized system for evaluating the speed or sensitivity or any other desired factors of the film being used in the two cameras. The markings shown in the drawings are those of degrees Din, according to the German system, but obviously other markings may be substituted. The front face of the gear 48 is provided with film sensitivity scale graduations surrounding the periphery of the scale disk 50, and corresponding to those of the scale disk 50, as best seen in Fig. 3. To allow the mechanism to be used also for differential filter factor adjustments as well as differential film speed adjustments, the smaller end of the scale disk 50 is provided with other graduations appropriate to filter factor, which cooperate with an index mark 67 on the knob 52, as shown in Fig. 3. Associated with the index mark are a pair of arrows and appropriate designations such as "O" for upper (ober) and "U" for lower (unter), indicating the respective directions in which the knob 52 is to be turned to adjust the diaphragm apertures differentially for filter factor, according as the filter is applied to the upper or lower lens. The graduations of the filter factor scale are preferably so related to the graduations of the film speed scale that a filter factor which would require doubling the exposure occupies the same angular extent as does a film speed difference which would require doubling the exposure. Thus, if the speed scale is graduated in degrees Din, a space of 3° on this scale occupies the same angular extent as the space from a filter factor of 1 to a filter factor of 2, on the filter factor scale.

If both cameras are loaded with film of equal sensitivity, then the film sensitivity graduations on the scale disk 50 are set opposite the corresponding graduations on the front face of the gear 48, which (through the connections of gears 48 and 46 to the diaphragm of the lower camera and connections of gears 47 and 45 to the diaphragm of the upper camera) will cause both diaphragms to be opened to the same stop or aperture. Then whenever the knob 52 is turned in one direction or the other, both gears will be simultaneously turned to equal extents, the gear 48 being driven by means of the intermediate driving member 50 and the projections 54 and 56, while the gear 47 is driven through the spline connection 58, 59, and the diaphragms of both shutters will remain at equal settings as they are adjusted either larger or smaller.

But if one camera is loaded with film of a different sensitivity from the other, then for any given condition of illumination, the diaphragm aperture of the camera having the film of higher sensitivity or speed should be stopped down to a smaller opening than that of the camera having the film of lower sensitivity or speed, in order that the same exposure time calculations may apply equally to both cameras. To accomplish this differential setting of the two diaphragms, the knob 52 is grasped and pulled axially outwardly or forwardly, against the force of the spring 61, the spring 62 meanwhile keeping the scale disk 50 tight against the rear face of the knob 52. This is the position of the parts shown in Fig. 5, and serves to withdraw the projection 56 from the indentation 57 in which it was seated. The knob 52 may then be turned in one direction or the other, so as to bring the particular scale marking on the disk 50 which represents the speed or sensitivity of the film in the upper camera, opposite the scale marking on the gear 48 which represents the film speed or sensitivity of the film in the lower camera. The forward pull on the knob 52 is then released, allowing the spring 61 to withdraw the shaft 49 and knob 52 rearwardly to initial home position, but with the projection 56 now seated in a different one of the indentations or recesses 57. During this rotary adjusting movement of the knob 52, the gear 48 connected to the diaphragm of the lower camera has not been turned, because of the disconnection of the projection 56 from the recess 57, but the gear 47 connected to the upper camera has been turned, with consequent change in the aperture of the diaphragm of the upper camera. The parts being now once more coupled or connected to each other in this changed or differential relationship, it is seen that further turning of the knob 52 will serve, as before, to adjust simultaneously the diaphragm apertures of both cameras, but the two apertures will now be different, rather than the same. Turning the knob 52 to adjust the aperture of either one of the cameras in accordance with prevailing light conditions and shutter speed setting, will automatically cause a corresponding adjustment of the aperture of the other camera, but with due regard to the relative sensitivities of the film. If the operator properly sets the scales (e. g., at the time that the cameras are loaded with their supplies of film of different sensitivities) then he need not give further attention to the fact that the two joined cameras are loaded with film of different sensitivities, but can merely make his aperture adjustments (by turning the knob 52) and calculate his shutter speed in accordance with his light meter or by other calculations referring to the sensitivity of film in one of the cameras, and he will be assured that the same shutter speed may be used for the other camera without further aperture adjustment and notwithstanding the difference in film sensitivity.

In case duplicate filters are used on the lenses of both cameras, no differentiation of diaphragm aperture is needed on account of filter factor, because the same filter factor would apply to both cameras. But if a filter is used on the lens of one camera and not on the other, or if different filters with different filter factors are used on the two lenses, then further differentiation of apertures of the two cameras should be made, in addition to any differentiation required by different film sensitivities. This is accomplished, with the construction already described, by pulling out the knob 52 axially, just as previously mentioned, but meanwhile holding the scale disk 50 rearwardly by finger pressure, in the manner shown in Fig. 6 of the drawings. In this way, the projection 56 is held seated in its recess 57 instead of being disconnected therefrom, but the projection 54 on the rear face of the knob 52 is removed from its recess 55. Then by holding the parts in this position, the knob 52 may be turned, thereby turning the gear 47 connected to the upper camera without causing any turning of the gear 48 connected to the lower camera, and a suitable difference in diaphragm aperture may be set or adjusted, in accordance with the filter factor scale above mentioned, read in conjunction with the index mark 67. Then the knob 52 is released and retracted rearwardly by its spring 61, seating the projection 54 in a different one of the recesses 55. As before, the diaphragm aperture of both cameras may thereafter be simultaneously opened or closed by turning the knob 52. Any calculations of aperture and shutter speed, made with respect to one camera, will be correct for the other camera also, notwithstanding the difference in filter factor.

The actual diaphragm apertures existing at any moment in the two cameras will be read, not by the scales associated with the member 50 (for these scales indicate certain differences in aperture, rather than absolute values of aperture) but rather by the usual conventional aperture of "f" number scales associated in usual known manner with each of the lens and shutter assemblies. The aperture scale values (and also the shutter speed scale values) may be made visible at the top of the camera in the usual manner customary in "Rolleiflex" cameras, the aperture scale for the upper camera being marked, for example, on a flange carried by the gear 45 and visible through a window in the camera housing, above this gear.

In case the shutter of one camera has a maximum aperture which is smaller than that of the other camera, or in case one camera is provided with film which is substantially faster or more sensitive than that of the other, there is the possibility that the diaphragm aperture of one camera may reach its fully opened position at a time when the diaphragm of the other camera is still capable of being opened to a greater aperture. In order to permit the second camera to be used at the greater aperture of which it is capable, the connections of the gears 45 and 46 to the corresponding diaphragm adjusting members of the shutters preferably are made with provision for lost motion, as already mentioned above, so that when one reaches its maximum position, its gear (45 or 46) may still turn farther, so as not to interfere with adjustment of the diaphragm of the other camera. But when this is done, there should be some provision for blocking operation of the camera whose effective practical limits have been exceeded, so that the operator will not be misled into thinking that this camera is properly adjusted for use according to necessary conditions of aperture and shutter speed.

To accomplish this, the gear 45 is provided with a circumferentially extending flange or wing 63 which projects radially beyond the teeth of the gear, into position to cooperate with a notch 64 in the shutter trigger or release plunger 18 of the upper camera. As long as the gear 45 is turning in the range where it may effectively adjust the diaphragm, the flange 63 is free of the notch 64. Just as the gear 45 reaches the limit of its effective adjusting motion and begins its ineffective or lost motion movement, the advancing edge of the flange 63 enters the notch 64, and thereafter as the gear 45 continues its lost motion movement, the outer edge of the flange 63 continues to slide through the notch 64, all this time serving to lock the release trigger or plunger 18 against operation, so that a picture cannot be taken with this camera until the gear 45 is back in its normal range of movement, which withdraws the flange 63 from the notch 64.

A similar arrangement is provided for the lower camera, where the flange or wing 65 secured to the gear 46 co-operates in the same manner with the notch 66 of the shutter release plunger or trigger 18' of the lower camera. Whenever the gear 46 exceeds its normal adjusting travel and starts its lost motion movement, the flange 65 enters the notch 66 and prevents the shutter of the lower camera from being tripped.

In the modified construction shown in Figs. 7, 8, and 9, the filter factor adjustment may be made without the necessity of holding the scale disk with the finger, as was done in Fig. 6. In this alternative construction, the gears 47 and 48 are the same as before, only the latter being shown, and the former is splined to the shaft just as in the previous case, the gear 48 being rotatable on the shaft as well as movable axially. The shaft is here indicated by the numeral 69 rather than the numeral 49 previously used, but it will be understood that the shaft has the same enlarged end 60 and spring 61 as previously.

Near the forward end of the shaft is an enlarged collar 68 lying in a cutout or recess 80 formed in the rear face of the scale disk 70 which corresponds substantially to the scale disk 50 of the previous embodiment. Forwardly from this collar 68 is a reduced portion 71 of the shaft, to which reduced portion the knob 72 is fixed as by the pin 73. A projection 74 extends forwardly from the collar 68, and is adapted to be seated in any one of a circumferentially arranged series of recesses or indentations 75 formed in the rear face of the cutout portion 80 of the scale disk, at angular intervals corresponding to the graduations of the film sensitivity scale which is placed on this disk 70 just as in the case of the previous disk 50. A projection 76 on the rear face of the disk 70 may be seated in any one of a series of recesses or indentations 57 in the gear 48, just as before. A spring 82, stronger than the spring 61, surrounding the reduced portion 71 of the shaft, presses forwardly on the knob 72 and rearwardly on the scale disk 70, and constantly tends to hold the scale disk rearwardly against the flange 68. The same graduations are provided on the knob and the scale disk and the gear, as in the previous embodiment.

With this construction, adjustment of the relative apertures of the two cameras, to take care of different film sensitivities or speed, is accomplished in the manner shown in Fig. 9, pulling forwardly on the knob 72 to pull the scale disk 70 away from the front face of the gear 48, to release the projection 76 from one of the depressions 57 and allow it to be turned to seat in a different depression 57. Adjustment of filter factor is accomplished in the manner shown in Fig. 8, pressing axially inwardly on the knob 72. This compresses the spring 82, moves the entire shaft 69 rearwardly to unseat the projection 74 from the recess 75 in which it was seated, whereupon the knob 72 and the rear gear 47 constantly connected thereto may be turned relative to the scale disk 70 and gear 48, to adjust for filter factor, after which the projection 74 is again seated in a different one of the recesses or indentations 75.

With an arrangement similar to the modification shown in Figs. 7–9, it is also possible to provide for automatic adjustment of filter factor, when a filter is placed on the lens and shutter of one of the cameras. Such an arrangement is illustrated diagrammatically in Fig. 10. The filter mounting is shown at 83, and is provided with a series of bayonet slots 89 (only one of which is shown) which engage with fixed lugs 88 on the camera body, for securing the filter detachably to the camera body. The diaphragm adjusting knob corresponds in general to the knob 72 of the embodiment shown in Figs. 7–9, and is here designated in Fig. 10 by the numeral 72'. But it is slightly modified so as to have, at its front end, a toothed gear 87, and rearwardly of this gear a flat flange 84 of larger diameter than the gear.

The filter mount 83 is provided with a short gear tooth segment 86 of a proper diameter to mesh with the gear teeth 87, and having a flat rear face adapted to press against the flat flange 84 of the knob 72' when the filter is being placed in position on the camera. The gear segment is in such position that when the proper one of the bayonet slots 89 is alined with the appropriate one of the lugs 88, and is moved rearwardly axially to start the operation of mounting the filter on the shutter, the rear face of the gear segment 86 will overlie the edge of the flange 84 and will press the knob 72' rearwardly, in a manner similar to the action depicted in Fig. 8 of the drawings, thereby disconnecting the projection 74 from the indentation 75. Then when the filter is rotated on the shutter, to carry the lug 88 into the circumferentially extending part of the bayonet slot, this rotary or circumferential movement of the filter mount carries the gear segment 86 past the teeth of the gear 87, in mesh therewith, thereby turning the knob 72' to an extent depending upon the toothed length of the segment 86, which in turn depends upon the filter factor of this particular filter, different lengths of toothed segments being provided for filters of different factors. Before the rotary motion of the filter is completed, the gear segment 86 completes its travel past the gear 87 and past the flange 84, so that the spring 82 is able to move the knob 72' forwardly to seat the projection 74 in whichever one of the indentations 75 is now alined with it. Thus the differentiation of the diaphragm apertures of the two cameras, on account of filter factor, is automatically made when the filter is mounted on the camera.

In removing the filter from the camera, the knob 72' must first be pressed rearwardly by manual pressure, to bring the flange 84 to a plane behind the rear face of the gear segment 86, before the filter mounting 83 can be turned clockwise to disconnect the bayonet slot from the mounting lug 88. During the turning of the filter to disconnect it, the knob 72' is automatically turned (by the gear segment 86) in the reverse direction from the direction in which it was turned during installation, so that the relative apertures of the two cameras are restored to the positions they had before the filter was placed on the camera.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A multiple photographic camera construction including a plurality of individual photographic cameras mounted within a common housing, each of said cameras having an optical axis and a diaphragm adjusting ring mounted for rotation about said axis as a center, a first element in the form of a rotatable shaft mounted on said housing, first means urging said shaft axially in one direction relative to said housing, a second element slidably and non-rotatably mounted on said shaft and engaging with one of said diaphragm adjusting rings, said second element being adapted to rotate said one diaphragm adjusting ring as said shaft is turned, a third element rotatably mounted on said shaft and engaging with another of said diaphragm adjusting rings, a fourth element carried by said shaft and urged by said means into operative engagement with said third element, said fourth element being adapted to be driven by said first element and drive said third element and said other diaphragm aperture adjusting ring when said shaft is turned, and a releasable and adjustable driving connection between said fourth element and at least one of said first and third elements so that said third element may be adjusted angularly relative to said first and second elements.

2. A construction as defined in claim 1, further including a filter factor scale carried by one of said first, third, and fourth elements for use when a light filter is used with one of said cameras, an index carried by another of said first, third, and fourth elements, and means urging said first and third elements into operative engagement whereby disengagement of said first and third elements and rotation of said first element relative to said third element will move said index relative to said filter factor scale and will differentially adjust said diaphragm aperture adjusting rings in accordance with the filter factor of a light filter carried by either of said cameras.

3. A construction as defined in claim 1, wherein said means includes a resilient member, and wherein said driving connection includes a pin connected to one of said first, third, and fourth elements, and socket means on another of said first, third, and fourth elements, said pin and socket means being urged into operative engagement by said resilient member and being adapted to maintain said second and third elements in fixed angular relation to each other.

4. A construction as defined in claim 1, in which said releasable and adjustable driving connection includes two such connections, one between said first and fourth elements, the other between said fourth and third elements.

5. A construction as defined in claim 4, in which each of said releasable and adjustable driving connections includes a projection on one of the elements to be connected, and a plurality of sockets on the other of the elements to be connected, the projection being releasable from any one socket and being capable of being seated in any other socket by moving the two elements relative to each other in a direction axially of said shaft element and then turning one element relative to the other.

6. A photographic camera construction comprising two shutter and lens assemblies mounted with their optical axes substantially parallel to and spaced from each other and adapted to expose selectively two photographic films having different film speeds, each assembly including an adjusting gear mounted for rotation substantially about the optical axis of its assembly, a single adjusting shaft for rotating the adjusting gears of both shutter assemblies both simultaneously and differentially with respect to each other, so that said adjusting gears of the two shutter assemblies may be adjusted differentially to compensate for variable differences in the two film sensitivities and thereafter may be adjusted simultaneously to compensate for variable light conditions, a first driving gear meshing with said adjusting gear of the first shutter assembly and non-rotatably connected to said shaft to turn therewith, a second driving gear meshing with said adjusting gear of the second shutter assembly and rotatable on said shaft, an intermediate driving member operatively interposed between said shaft and said second driving gear, said intermediate member being selectively connectible both to said shaft and to said second driving gear in various angular relationships to both of them, a graduated scale showing the angular relationship of said intermediate member to said second driving gear, and a second graduated scale showing the angular relationship of said intermediate member to said shaft.

7. A construction as defined in claim 6, further including an accessible actuating knob on said shaft spaced axially from said second driving gear, said shaft being movable axially with respect to said second driving gear and said intermediate member being mounted on said shaft between said knob and said second driving gear, a first spring tending to move said shaft axially to move said knob toward said second driving gear, and a second spring associated with said intermediate member and tending to move said intermediate member in one direction axially along said shaft.

8. A construction as defined in claim 7, in which said second spring tends to move said intermediate member away from said second driving gear and toward said knob.

9. A construction as defined in claim 7, in which said second spring tends to move said intermediate member away from said knob and toward said second driving gear, and further including a collar on said shaft to limit the extent of movement of said intermediate member away from said knob when said knob is shifted axially away from said second driving gear.

10. A construction as defined in claim 7, further including an optical filter adapted to be mounted on one of said shutter and lens assemblies by an axial mounting movement followed by a rotary movement, said filter including a gear segment in position to engage said knob when said filter is being mounted on its shutter and lens assembly, first to move said knob axially against the force of one of said springs while said filter is being moved axially and thereafter to turn said knob during the rotary part of the mounting movement of the filter.

11. A photographic camera construction comprising a housing having two lens and shutter assemblies mounted thereon, a diaphragm aperture adjusting member rotatably mounted on each assembly, a rotary control member normally operatively connected to both of said adjusting members so that rotary movement of said control member will normally adjust the apertures of both of said shutter assemblies simultaneously, means for temporarily disconnecting said control member from one of said adjusting members while keeping it operatively connected to the other of said adjusting members, so that the apertures of the two shutter assemblies may be differentially adjusted in accordance with different film sensitivities of films associated with the respective shutter assemblies, and a scale graduated in terms of film sensitivity and associated with said control member for indicating in terms of film sensitivity the extent to which one aperture is adjusted differently from the other.

12. A photographic camera construction comprising a housing having two lens and shutter assemblies mounted thereon, a diaphragm aperture adjusting member rotatably mounted on each assembly, a rotary control member normally operatively connected to both of said adjusting members so that rotary movement of said control member will normally adjust the apertures of both of said shutter assemblies simultaneously, means for temporarily disconnecting said control member from one of said adjusting members while keeping it operatively connected to the other of said adjusting members, so that the apertures of the two shutter assemblies may be differentially adjusted in accordance with a filter factor of a filter applied to one of said assemblies, and a scale graduated in terms of filter factor and associated with said control member for indicating in terms of filter factor the extent to which one filter factor is adjusted differently from the other.

13. A construction as defined in claim 12, further including an optical filter adapted to be attached to one of said lens and shutter assemblies upon predetermined movement relative to such assembly, and means carried by said filter and effective during said predetermined movement of said filter for engaging said control member and disengaging said control member from one of said assemblies and turning said control member while so disengaged, to effect differential setting of the respective apertures in accordance with the filter factor of the filter.

14. A construction as defined in claim 11, in which said means for temporarily disconnecting said control member is operated by axial movement of said control member.

15. A construction as defined in claim 12, in which said means for temporarily disconnecting said control member is operated by axial movement of said control member.

16. A construction as defined in claim 11, further including a shutter release member associated with each of said assemblies, and means effective upon predetermined movement of the aperture adjusting member of either assembly, for locking the shutter release member of that assembly against shutter releasing movement.

17. A construction as defined in claim 12, further including a shutter release member associated with each of said assemblies, and means effective upon predetermined movement of the aperture adjusting member of either assembly, for locking the shutter release member of that assembly against shutter releasing movement.

18. A photographic camera comprising a unitary body structure including two exposure chambers adapted to be loaded with two separate films having different film sensitivities, two separate lens, shutter, and diaphragm units, one positioned to make an exposure on one of said films and the other positioned to make an exposure on the other of said films, each of said units having a similar exposure factor adjusting member, for adjusting a factor influencing the exposure value of an exposure made with such unit, the respective adjusting members serving to adjust the same factor in both units, a common manipulating member, two driving connections between said manipulating member and the respective adjusting members of the respective units, said two driving connections being normally effective upon movement of said manipulating member to adjust said factor of both of said units simultaneously to the same degree, and variable adjusting means in the driving connection between said manipulating member and one of said units, whereby the respective factors of the two units may be initially set at a variable differential to each other in accordance with a variable differential between the respective speeds of the two films, subsequent adjustment of said manipulating member serving to adjust said variable factor of both units simultaneously in accordance with variations in light conditions affecting both films while maintaining the differential adjustment resulting from different film speeds.

References Cited in the file of this patent

UNITED STATES PATENTS

| | | |
|---|---|---|
| 1,447,906 | Snyder et al. | May 6, 1923 |
| 2,059,032 | Riszdorfer | Oct. 27, 1936 |
| 2,530,793 | Thomas | Nov. 21, 1950 |

FOREIGN PATENTS

| | | |
|---|---|---|
| 234,599 | Switzerland | Oct. 15, 1944 |
| 902,509 | France | Dec. 15, 1944 |
| 164,747 | Austria | Dec. 10, 1949 |

UNITED STATES PATENT OFFICE

CERTIFICATE OF CORRECTION

Patent No. 2,800,842                                                    July 30, 1957

Hermann Friedrich Albrecht

It is hereby certified that error appears in the above numbered patent requiring correction and that the said Letters Patent should read as corrected below.

In the grant, line 16, and in the heading to the printed specification, line 10, for August 23, 1974, each occurrence, read -- May 6, 1969 --; in the printed specification, column 3, line 8, after "mirror" insert -- out --.

Signed and sealed this 24th day of December 1957.

(SEAL)
Attest:

KARL H. AXLINE
Attesting Officer

ROBERT C. WATSON
                                                                         Commissioner of Patents